United States Patent [19]

Collins et al.

[11] Patent Number: 4,913,411
[45] Date of Patent: Apr. 3, 1990

[54] HIGH-CAPACITY ELASTOMERIC COMBINATION JOURNAL-THRUST BEARING

[75] Inventors: Frederick E. Collins, Creswell, Oreg.; Gary L. Whightsil, Sr., Fort Worth, Tex.

[73] Assignee: LTV Energy Products Co., Houston, Tex.

[21] Appl. No.: 314,244

[22] Filed: Feb. 21, 1989

Related U.S. Application Data

[63] Continuation of Ser. No. 132,551, Dec. 14, 1987, abandoned.

[51] Int. Cl.⁴ ............................................. F16F 1/38
[52] U.S. Cl. ............................ 267/141.5; 248/635; 267/141.4; 267/153; 267/281; 267/293; 384/424; 416/134 R; 416/148; 464/89
[58] Field of Search ............ 267/141.2, 141.3, 141.4, 267/141.5, 141.7, 153, 279, 281, 292, 293, 294; 384/424; 416/134 R, 134 A, 148, 102; 464/89; 248/635; 180/300, 312, 902

[56] References Cited

U.S. PATENT DOCUMENTS

| | | | |
|---|---|---|---|
| 2,097,318 | 10/1937 | Dowell | 230/272 |
| 2,231,037 | 2/1941 | Taylor | 267/21 |
| 2,235,605 | 3/1941 | Bugatti | 464/89 |
| 2,269,799 | 1/1942 | Upson | 170/173 |
| 2,482,488 | 9/1949 | Julien | 262/292 X |
| 2,784,998 | 3/1957 | Blackwood | 295/43 |
| 3,323,326 | 6/1967 | Vertson | 464/8 |
| 3,834,181 | 9/1974 | Strasburg et al. | 416/134 X |
| 4,501,633 | 2/1985 | Zodrow et al. | 156/242 |

FOREIGN PATENT DOCUMENTS

| | | | |
|---|---|---|---|
| 630182 | 5/1936 | Fed. Rep. of Germany | 267/279 |
| 213019 | 6/1923 | United Kingdom | 269/141.3 |
| 282188 | 12/1927 | United Kingdom | 267/141.7 |
| 610956 | 10/1948 | United Kingdom | 267/141.3 |

Primary Examiner—George E. A. Halvosa

[57] ABSTRACT

A high-capacity elastomeric combination journal-thrust bearing comprises at least one encapsulated lobe. The encapsulated lobe comprises an outer tubular member having a first ring joined along substantially all of its outer periphery to the inner periphery of the outer tubular member at a first end and having a second ring joined along substantially all of its outer periphery to the inner periphery of the outer tubular member at a second end. The encapsulated lobe further comprises an inner tubular member having the same longitudinal axis of the outer tubular member, and having a third ring joined along substantially all of its inner periphery to the outer periphery of the inner tubular member, spaced between the first and second rings. An elastomer separates and joins the rings to each other and to the tubular members, and the tubular members to each other. As the radial distance from the longitudinal axis increases, the thickness of the elastomer increases.

6 Claims, 4 Drawing Sheets

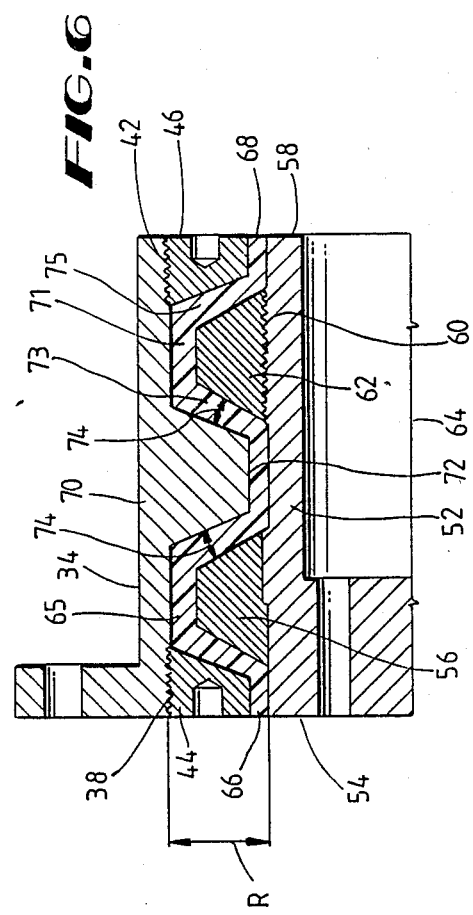
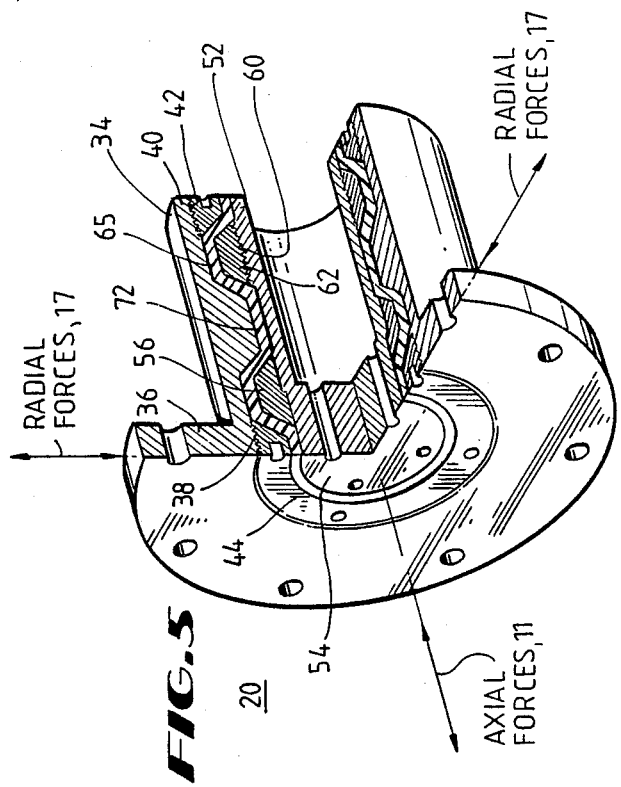
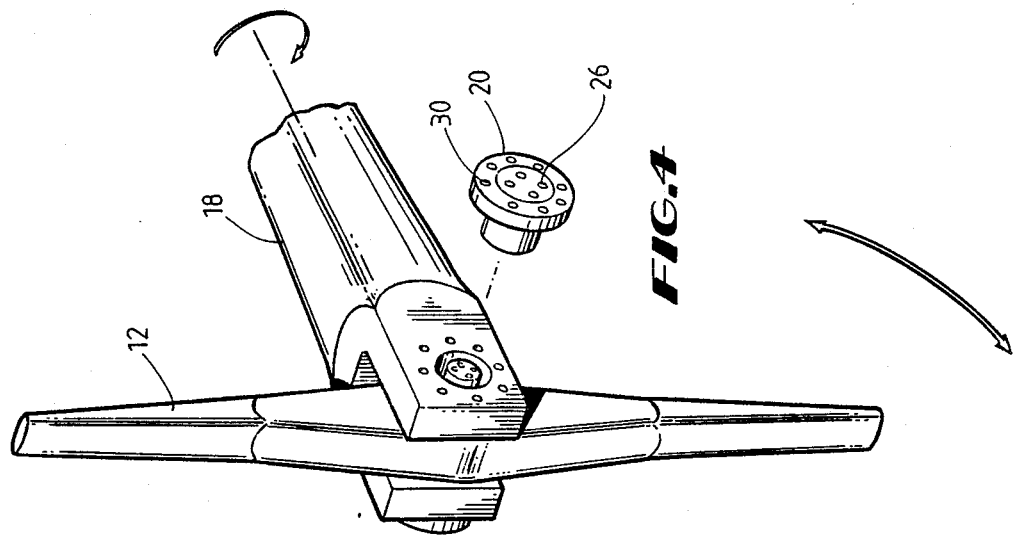

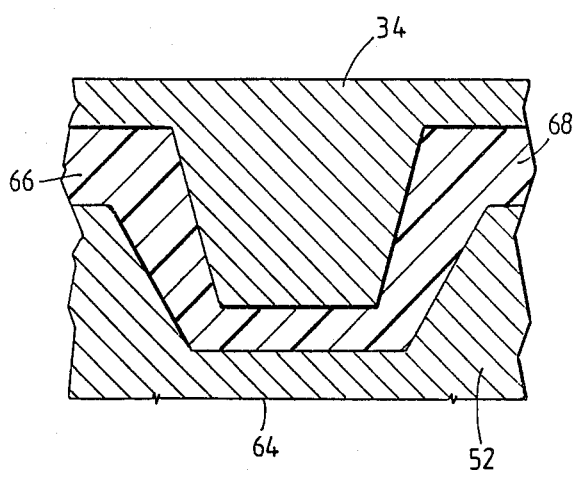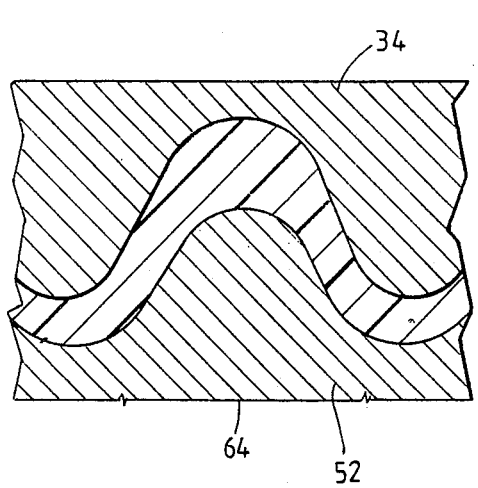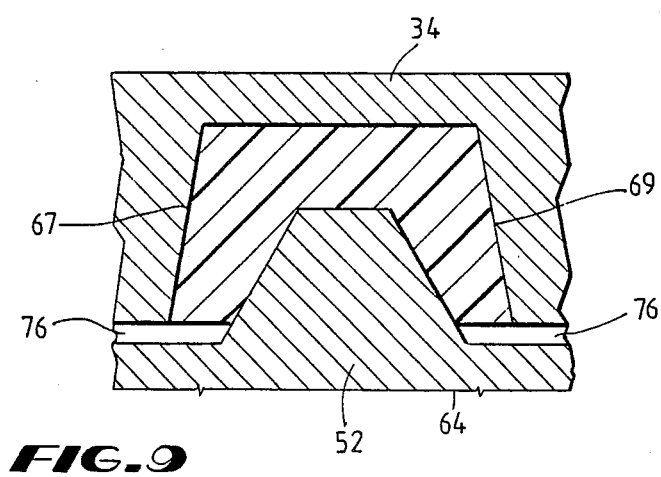

HIGH-CAPACITY ELASTOMERIC COMBINATION JOURNAL-THRUST BEARING

This is a continuation of co-pending application Ser. No. 132,551 filed on 12-14-87, now abandoned.

BACKGROUND AND SUMMARY OF THE INVENTION

This invention relates to high-capacity elastomeric bearings, and more particularly to elastomeric bearings for use when the axial and/or radial loads are high and the torsional oscillations are small.

Conventional tapered roller or spherical roller bearings have not given adequate life in applications such as wind turbine blade teeter systems and offshore mooring systems, where axial and/or radial loads are high and torsional oscillations are small. Conventional high-capacity elastomeric laminate bearings have been successful, but they have required up to a fifty percent larger space envelope than the roller bearings.

FIG. 1 and FIG. 2 illustrate cross-sectional views of prior art conventional high-capacity elastomeric laminate bearings. Referring now to FIG. 1, a combination stacktube bearing is illustrated. Inner bearings 10 are referred to in the industry as "stack form" bearings. In wind turbine applications the stack form bearings 10 bear the axial loads or forces 11 (the weight of a blade rigidly attached to a teeter pin 14). Outer bearings 16 are referred to in the industry as "tube form" bearings. The tube form bearings 16 bear the radial loads or forces 17 (the weight of a blade plus the torque exerted by the blade/teeter pin combination against a yoke 18). Both bearings 10 and 16 are made of an elastomer such as silicone, natural rubber, polybutadiene, nitrile, or neoprene.

It is well known in the art that the spring rate of the stack form bearings 10 (the axial spring rate) should be matched as closely as possible with the spring rate of the tube form bearings 16 (the radial spring rate). This is required to keep the deflection across each bearing equal in order to minimize the bobbing of the blades as they rotate. The bobbing of the blades increases fatigue on the elastomer. However, in some applications, it has not been possible to achieve the desired matching of the axial and radial spring rates and still keep the overall dimensions of the combination stack-tube bearing within the desired limits.

Therefore, some have attempted to solve this problem with the conical bearing illustrated in FIG. 2. However, the conical bearing illustrated in FIG. 2, although its overall dimensions could be made smaller, wore out quickly when sized to the same dimensions as a metal bearing, because due to the geometry, the elastomer strain levels were not uniform.

Existing prior art formulas for predicting axial and radial spring rates were based on mathematical assumptions applicable only to the type of bearings illustrated in FIG. 1 and FIG. 2. Therefore, no formula applied to the unique configuration of the present invention. Thus, a finite element computer program was used to evaluate (as is common in the industry) the unique configuration of the present invention, and to calculate the axial and radial spring rate constants.

The present invention addresses the above-noted and other drawbacks to the prior art by providing an apparatus for a high-capacity elastomeric combination journal-thrust bearing which achieves the durability of the elastomeric laminate bearings. This invention eliminates the undesirable feature common to the laminate bearings of the type illustrated in FIG. 1, wherein the laminate bearings require up to a fifty percent larger space envelope than the conventional tapered roller or spherical roller bearings. The invention is believed to be the first elastomeric bearing which can achieve a closer matching of axial and radial spring rates than achieved by the larger prior art elastomeric laminate bearing of FIG. 1, and yet the bearing of the present invention fits into the same space envelope as the double cylindrical roller and double tapered roller bearings it replaces.

The high-capacity elastomeric combination journal-thrust bearing built according to the present invention comprises an encapsulated lobe. The encapsulated lobe comprises an outer tubular member, an inner tubular member, rings joined to the inside of each end of the outer tubular member, a third ring spaced between the first two rings, and an elastomer. The third ring is joined along its inner periphery to the outside of the inner tubular member. The elastomer joins the first and second rings to the inner tubular member, the third ring to the outer ring, the third ring to the first and second rings, and the inner tubular member to the outer tubular member. As the radial distance from the longitudinal axis of the tubular members increases, the thickness of the elastomer increases.

In yet another feature of the invention, the bearing comprises a plurality of encapsulated lobes.

BRIEF DESCRIPTION OF THE DRAWINGS

The above-noted and other aspects of the present invention will become more apparent from a description of the preferred embodiment when read in conjunction with the accompanying drawings.

The drawings illustrate the preferred embodiment of the invention, wherein like members bear like reference numerals and wherein:

FIGS. 3A and 4 are exploded views illustrating the connection of a high-capacity elastomeric bearing to a teeter pin and a yoke, common in wind turbine applications;

FIG. 5 illustrates a combination perspective and cutaway view of a high-capacity elastomeric bearing having two encapsulated lobes;

FIG. 6 illustrates a cross-sectional side view of a high-capacity elastomeric bearing having two encapsulated lobes;

FIG. 7 illustrates a cross-sectional side view of a high-capacity elastomeric bearing, wherein the injection points of the elastomer are wider than the rest of the encapsulated lobe;

FIG. 8 illustrates a cross-sectional side view of a high-capacity elastomeric bearing, wherein the bearing comprises more than one but less than two encapsulated lobes; and FIG. 9 illustrates a cross-sectional side view of a high-capacity elastomeric bearing, wherein the injection points of the elastomer are substantially perpendicular to the longitudinal axis of the bearing.

DESCRIPTION OF THE PREFERRED EMBODIMENT

Figure 1:
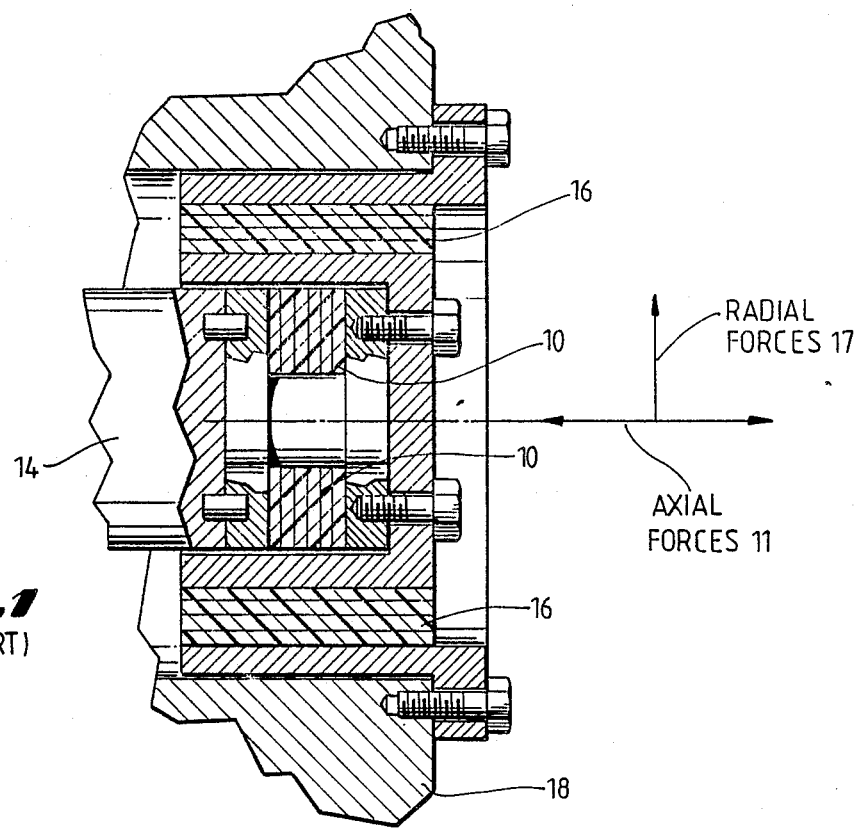
FIG. 1 is a cross-sectional view of a prior art combination stack-tube high-capacity elastomeric bearing.
Figure 2:
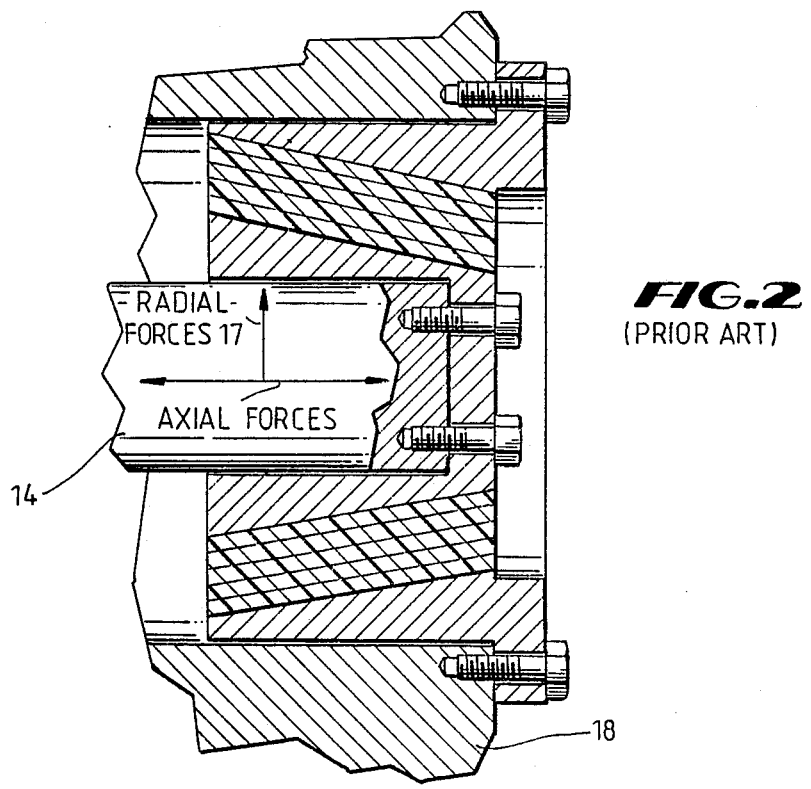
FIG. 2 is a cross-sectional view of a prior art conical high-capacity elastomeric bearing.
Figure 3A:
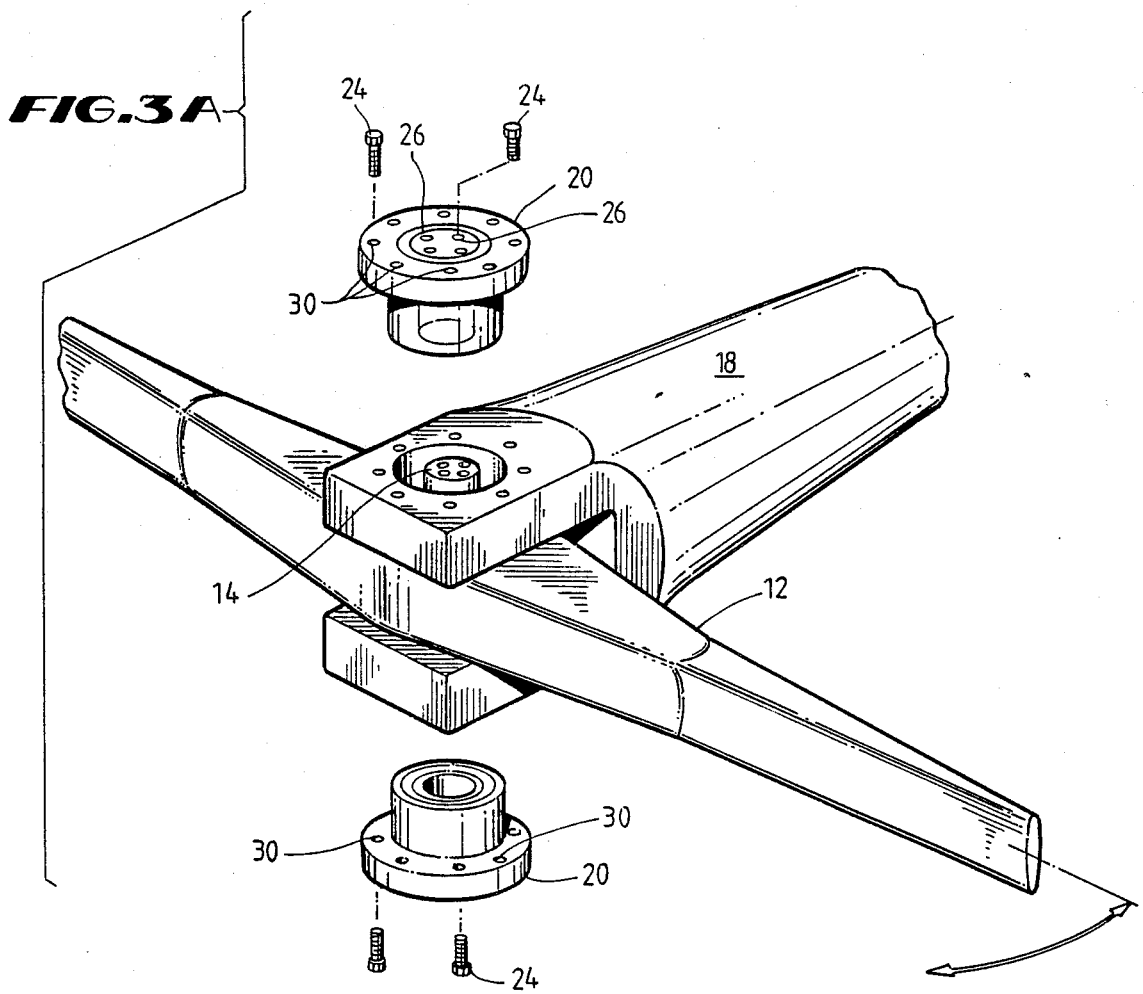
Figure 3B:
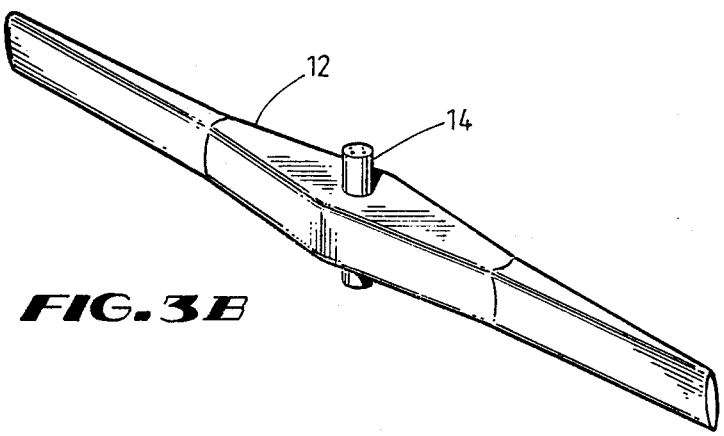
FIG. 3B illustrates the rigid connection between the teeter pin and the blade of FIGS. 3A and 4.

FIG. 3A and FIG. 4 are exploded views of a high-capacity elastomeric bearing 20 built according to the present invention, connected to each end of a teeter pin 14, which is rigidly connected to a blade 12. The teeter pin 14 connected to the blade 12 is depicted in FIG. 3B. The teeter pin 14 is connected to the bearing 20 by bolts 24 inserted through bolt holes 26 in the bearing, and secured by nuts (not shown). The blade 12 is typically a blade which requires high-capacity bearings as, for example, a blade in a wind turbine blade teeter system. A yoke 18 drives an external power generator (not shown). Through bolt holes 30, bolts 24 connect the yoke 18 to the bearing 20.

Referring to both FIG. 5 and FIG. 6, the bearing 20 includes an outer cylindrical or tubular member 34 with internal threads 38 at an outer or first end 36. The outer tubular member 34 also has internal threads 42 at an inner or second end 40. A ring 44 is threaded into the threads 38, and a ring 46 is threaded into the threads 42. Although the rings 44 and 46 are described as being threaded into the outer tubular member, any other suitable means of connecting the rings to the outer tubular member may be used. For example, the rings may be press fitted into the outer tubular member.

The bearing 20 further includes an inner cylindrical or tubular member 52, which is connected via the bolts 24 through the bolt holes 26 to the teeter pin 14. A ring 56 is attached to a first or outer end 54 of the inner tubular member. The ring 56 may be threaded onto the first end 54 of the inner tubular member, but it is preferably joined by a "press-fit" connection. A second or inner end 58 of the inner tubular member has threads 60 around the outer periphery which thread into a ring 62. However, the ring 62 could be attached in a press-fit connection.

Using the bolt holes 26 and 30 to center the inner and outer tubular members about a rotational center line or longitudinal axis 64, an elastomer 65 having a shear modulus normally within the range of eighty to two hundred forty is injected at an injection point 66 between the ring 44 and the first end 54 of the inner tubular member, or at an injection point 68 between the ring 46 and the second end 58 of the inner tubular member.

As is commonly known in the art, a bonding agent is first applied to the tubular members 34 and 52 before the elastomer 65 is injected. After injection, the elastomer is vulcanized, which is a function of time, temperature, and pressure, which is well known in the art.

The combination of the injected elastomer 65, the ring 46, the ring 62, and one-half of a protrusion 70 which protrudes inwardly from the inner wall of the outer tubular member 34 comprises one encapsulated lobe 71. Except for the injection points 66 and 68, the elastomer is bounded on all sides. Thus, the elastomer is "encapsulated". Imagining the elastomer to be liquid, the flow of that liquid from the injection point 68 to a point 72 midway along the protrusion 70 experiences a substantially one hundred eighty degree change in flow direction. Thus, the elastomer 65 between points 68 and 72 is serpentine in longitudinal section and forms the first "lobe" 71. The lobe 71 has two longitudinally spaced, radially disposed arms 73 and 75. Similarly, the elastomer forms a second lobe between point 72 and point 66.

Computer simulations of the application of the embodiment of FIG. 5 were performed, with the outer tubular member having a thirty-inch outside diameter. The bearing of the present invention accomodates axial forces 11 and radial forces 17 as depicted in FIG. 5. The computer simulations showed that the embodiment of FIG. 5 could achieve lower strains in the elastomer and higher axial and radial spring rates than prior art designs of even larger dimensions.

The number of lobes affects the stiffness in the axial direction, i.e., parallel to the rotational center line 64. Although the preferred embodiment of the invention has two encapsulated lobes from the injection point 68 to the injection point 66, one encapsulated lobe will generally be sufficient. Thus, referring to FIG. 5 and FIG. 6, the part of the bearing 20 to the right of the midway point 72 could be deleted. The remaining part of the bearing 20 would still contain one encapsulated lobe of the elastomer 65.

It is important to note that as the radial distance from the longitudinal axis 64 increases, the bearing 20 is preferably designed to approximate a constant strain coefficient for accommodating torsional movement, that is, motion about the longitudinal axis 64. This may be done, as shown in FIGS. 7-9, by increasing the thickness 74 as the radial distance from the longitudinal axis 64 increases.

Referring back to FIG. 6, the inventors have discovered that as the radial height R of the lobe increases, the axial spring rate increases, and the radial spring rate decreases. That is, the bearing becomes stiffer in the axial (parallel to the rotational center line 64) direction, and softer in the radial (perpendicular to the rotational center line 64) direction.

FIGS. 7, 8, and 9 illustrate alternate embodiments of the present invention. In FIG. 7, the injection points 66, 68 are wider than the rest of the encapsulated lobe. In FIG. 8, the bearing comprises more than one but less than two encapsulated lobes. In FIG. 9, the injection paths 67, 69 are substantially perpendicular to the longitudinal axis 64. If the small annular space 76 between the outer and inner tubular members 34, 52 in FIG. 9 was filled with an elastomer, the elastomer would experience early fatigue and cracking for most applications, since the elastomer would be too thin for the relative movement between the inner and outer tubular members.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:
1. A bearing comprising:
   (a) an outer cylindrical member having a longitudinal axis and a bore extending longitudinally therethrough, said bore being defined by an annular wall;
   (b) an inner cylindrical member disposed co-axially within and radially spaced from the annular wall defining the outer cylindrical member bore;
   (c) the inner wall surface of the outer cylindrical member and the outer wall surface of the inner cylindrical member configured to define an annular space between the two cylindrical members, the annular space being serpentine in longitudinal section and defining at least one complete lobe having two longitudinally spaced, radially disposed arms which increase in longitudinal dimension with increasing radial dimension, and a longitudinally positioned arm interconnecting the radially disposed arms, and each of the radially disposed arms having a first longitudinal dimension adjacent the inner cylindrical member and a second longitudinal dimension adjacent the outer cylindrical member, the second longitudinal dimension being greater than the first longitudinal dimension;

(d) an elastomer filling and encapsulated within the annular space, wherein as the radial distance from the longitudinal axis increases, the longitudinal thickness of the elastomer increases.

2. A high-capacity elastomeric journal-thrust bearing comprising an encapsulated lobe wherein the encapsulated lobe comprises:

(a) an outer tubular member having a longitudinal axis, a first end, a second end, an inside, and an outside;

(b) a first ring having substantially all of its outer periphery joined to the inside of the outer tubular member adjacent the first end of the outer tubular member;

(c) a second ring having substantially all of its outer periphery joined to the inside of the outer tubular member adjacent the second end of the outer tubular member and longitudinally spaced from the first ring;

(d) an inner tubular member radially spaced from the first and second rings and radially centered with respect to the longitudinal axis and having an inside and an outside;

(e) a third ring having substantially all of its inner periphery joined to the outside of the inner tubular member, the third ring being spaced axially between the first and second rings and radially from the inside of the outer tubular member; and (f) an elastomer joining the first and second rings to the inner tubular member, the third ring to the outer tubular member, the third ring to the first and second rings, and the inner tubular member to the outer tubular member, wherein as the radial distance from the longitudinal axis increases, the longitudinal thickness of the elastomer increases, and wherein the radial thickness of the first, second, and third rings is greater than one-half the radial distance between the outer and inner tubular members.

3. The journal-thrust bearing of claim 2, further comprising a plurality of encapsulated lobes.

4. The journal-thrust bearing of claim 3 wherein the first and second rings are threaded into the outer tubular member, and the third ring is threaded onto the inner tubular member.

5. The journal-thrust bearing of claim 2 wherein the first and second rings are threaded into the outer tubular member, and the third ring is threaded onto the inner tubular member.

6. The journal-thrust bearing of claim 2, further comprising two encapsulated lobes.

* * * * *

UNITED STATES PATENT AND TRADEMARK OFFICE
CERTIFICATE OF CORRECTION

PATENT NO. : 4,913,411
DATED : Apr. 3, 1990
INVENTOR(S) : Frederick Emmet Collins and Gary Lloyd Whightsil, Sr.

It is certified that error appears in the above-identified patent and that said Letters Patent is hereby corrected as shown below:

Please correct claims 4 and 5 as follows:

4. The journal-thrust bearing of claim [3] _2_, wherein the first and second rings are threaded into the outer tubular member, and the third ring is threaded onto the inner tubular member.

5. The journal-thrust bearing of claim [2] _3_ wherein the first and second rings are threaded into the outer tubular member, and the third ring is threaded onto the inner tubular member.

Signed and Sealed this

Twenty-fifth Day of June, 1991

Attest:

HARRY F. MANBECK, JR.

*Attesting Officer*     *Commissioner of Patents and Trademarks*